(12) United States Patent
Tobari et al.

(10) Patent No.: US 12,744,479 B2
(45) Date of Patent: Sep. 22, 2026

(54) POWER CONVERTER

(71) Applicant: Hitachi Industrial Equipment Systems Co., Ltd., Tokyo (JP)

(72) Inventors: Kazuaki Tobari, Tokyo (JP); Yoshiyuki Taguchi, Tokyo (JP); Yuta Iwase, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 203 days.

(21) Appl. No.: 18/721,516

(22) PCT Filed: Jan. 17, 2023

(86) PCT No.: PCT/JP2023/001075
§ 371 (c)(1),
(2) Date: Jun. 18, 2024

(87) PCT Pub. No.: WO2023/199563
PCT Pub. Date: Oct. 19, 2023

(65) Prior Publication Data

US 2025/0062708 A1 Feb. 20, 2025

(30) Foreign Application Priority Data

Apr. 14, 2022 (JP) ................................ 2022-067257

(51) Int. Cl.
*H02P 21/05* (2006.01)
*H02P 21/02* (2006.01)
(Continued)

(52) U.S. Cl.
CPC .............. *H02P 21/05* (2013.01); *H02P 21/02* (2013.01); *H02P 21/14* (2013.01); *H02P 27/06* (2013.01)

(58) Field of Classification Search
CPC .......... H02P 21/05; H02P 21/02; H02P 21/14; H02P 27/06; H02P 6/10; H02P 23/04; H02P 29/50; G05B 2219/41121
See application file for complete search history.

(56) References Cited

U.S. PATENT DOCUMENTS

2011/0194947 A1* 8/2011 Hong ...................... F24F 11/86 417/44.11
2015/0180386 A1* 6/2015 Enoki ...................... H02P 6/10 318/400.23
(Continued)

FOREIGN PATENT DOCUMENTS

JP 2006-191737 A 7/2006
JP 2006-340446 A 12/2006
(Continued)

OTHER PUBLICATIONS

International Search Report (PCT/ISA/210) issued in PCT Application No. PCT/JP2023/001075 dated Apr. 4, 2023 with English translation (5 pages).
(Continued)

*Primary Examiner* — Bickey Dhakal
(74) *Attorney, Agent, or Firm* — Crowell & Moring LLP

(57) ABSTRACT

A power converter having a control unit that controls the output frequency, output voltage, and output current of the motor, wherein the control unit calculates a first torque current command from a deviation between a speed reference point and a speed estimate of the motor, The control unit switches the control mode to either a control mode that suppresses pulsation of the motor speed or a control mode that suppresses pulsation of the motor torque, and calculates a second torque current command from the first torque current command and the switched control mode.

11 Claims, 15 Drawing Sheets

(51) Int. Cl.
*H02P 21/14* (2016.01)
*H02P 27/06* (2006.01)

(56) References Cited

U.S. PATENT DOCUMENTS

| | | | | |
|---|---|---|---|---|
| 2019/0186480 | A1* | 6/2019 | Kulkarni | H02P 21/22 |
| 2020/0028454 | A1* | 1/2020 | Kinomura | H02P 29/50 |
| 2020/0153373 | A1 | 5/2020 | Lan et al. | |
| 2023/0029626 | A1* | 2/2023 | Wu | B60L 53/20 |
| 2023/0303060 | A1* | 9/2023 | Kikuchi | B60W 20/11 |

FOREIGN PATENT DOCUMENTS

| | | | | |
|---|---|---|---|---|
| JP | 2006350792 | A * | 12/2006 | G05B 19/19 |
| JP | 2018-14854 | A | 1/2018 | |

OTHER PUBLICATIONS

Japanese-language Written Opinion (PCT/ISA/237) issued in PCT Application No. PCT/JP2023/001075 dated Apr. 4, 2023 with English translation (7 pages).

* cited by examiner

Magnet Motors
Power converter
Coordinate conversion unit
Coordinate conversion unit
Frequency and phase estimation unit
Phase error estimation unit
Vector control unit
Filter calculator
Speed control arithmetic unit
1
2
3
4
5
6
7
8
9
1 0
1 1
$i_u, i_v, i_w$
$V_u^*, V_v^*, V_w^*$
$i_{uc}, i_{vc}, i_{wc}$
$\theta_{dc}$
$\omega_{dc}$
$V_{dc}^{**}$
$V_{qc}^{**}$
$i_{dc}$
$i_{qc}$
$i_q^*$
$i_{q0}^*$
$i_d^*$
$\omega_r^*$
+
−

7
71
72
73
74
Control mode selection unit
Damping ratio selector
1/P_m
$i_{q0}^*$
$\omega_r^*$
$i_q^*$
$\omega_n$
$\zeta_a$, $\zeta_b$
$\frac{1/\omega_n^2 S^2 + 2\zeta_a/\omega_n S + 1}{1/\omega_n^2 S^2 + 2\zeta_b/\omega_n S + 1}$ Motor torque
Load pulsation torque
60%
100
(%) 50
0
Speed command
Motor speed
Time A
Time
(%)
10
0

Load pulsation torque
Motor torque
100%
72%
100
(%) 50
0
Speed command
Motor speed
90
(%)
0
Time
Time C 100%
52%
Motor torque
Load pulsation torque
100
50
0
Motor speed
Speed command
90
0
Time
Time D 20
21
Voltage detector
22
Current detector
1
23
Encoder
θ
$V_u$, $V_v$, $V_w$
$i_{uc}$, $i_{vc}$, $i_{wc}$
24
Calculation part of vector current components
$V_{dc}$, $V_{qc}$
$i_{dc}$, $i_{qc}$
$\omega_{dc}$
25
Observation of each part waveform $i_q$(A)
0
10% speed of basal speed
Time
There is a drop to zero
$i_q$(A)
0
90% speed of basal speed
Time
DC components
Pulsating components Magnet Motors
Power converter
Coordinate conversion unit
Coordinate conversion unit
Vector control unit
Frequency and phase estimation unit
Phase error estimation unit
Filter calculator
Speed control arithmetic unit
1
2
3
4
5
6
7a
8
9
10
11
$i_u, i_v, i_w$
$V_u^*, V_v^*, V_w^*$
$i_{uc}, i_{vc}, i_{wc}$
$\theta_{dc}$
$\omega_{dc}$
$V_{dc}^{**}$
$V_{qc}^{**}$
$i_{dc}$
$i_{qc}$
$i_q^*$
$i_d^*$
$i_{q0}^*$
$\omega_r^*$
+
−

7a
7a1
$\frac{1/\omega_n^2 S^2 + 2\zeta_{a1}/\omega_n S + 1}{1/\omega_n^2 S^2 + 2\zeta_{b1}/\omega_n S + 1}$
7a5
$\frac{1/\omega_n^2 S^2 + 2\zeta_{a2}/\omega_n S + 1}{1/\omega_n^2 S^2 + 2\zeta_{b2}/\omega_n S + 1}$
7a2
$1/P_m$
$\omega_n$
$\omega_n$
7a3
Control mode selection unit
7a4
$i_{q0}^*$
$\omega_r^*$
$i_q^*$ 1
Magnet Motors
4
2
Power converter
3
11
Coordinate conversion unit
5
Coordinate conversion unit
10
Frequency and phase estimation unit
9
Phase error estimation unit
8a
Vector control unit
7b
Filter calculator
6
Speed control arithmetic unit
+
−

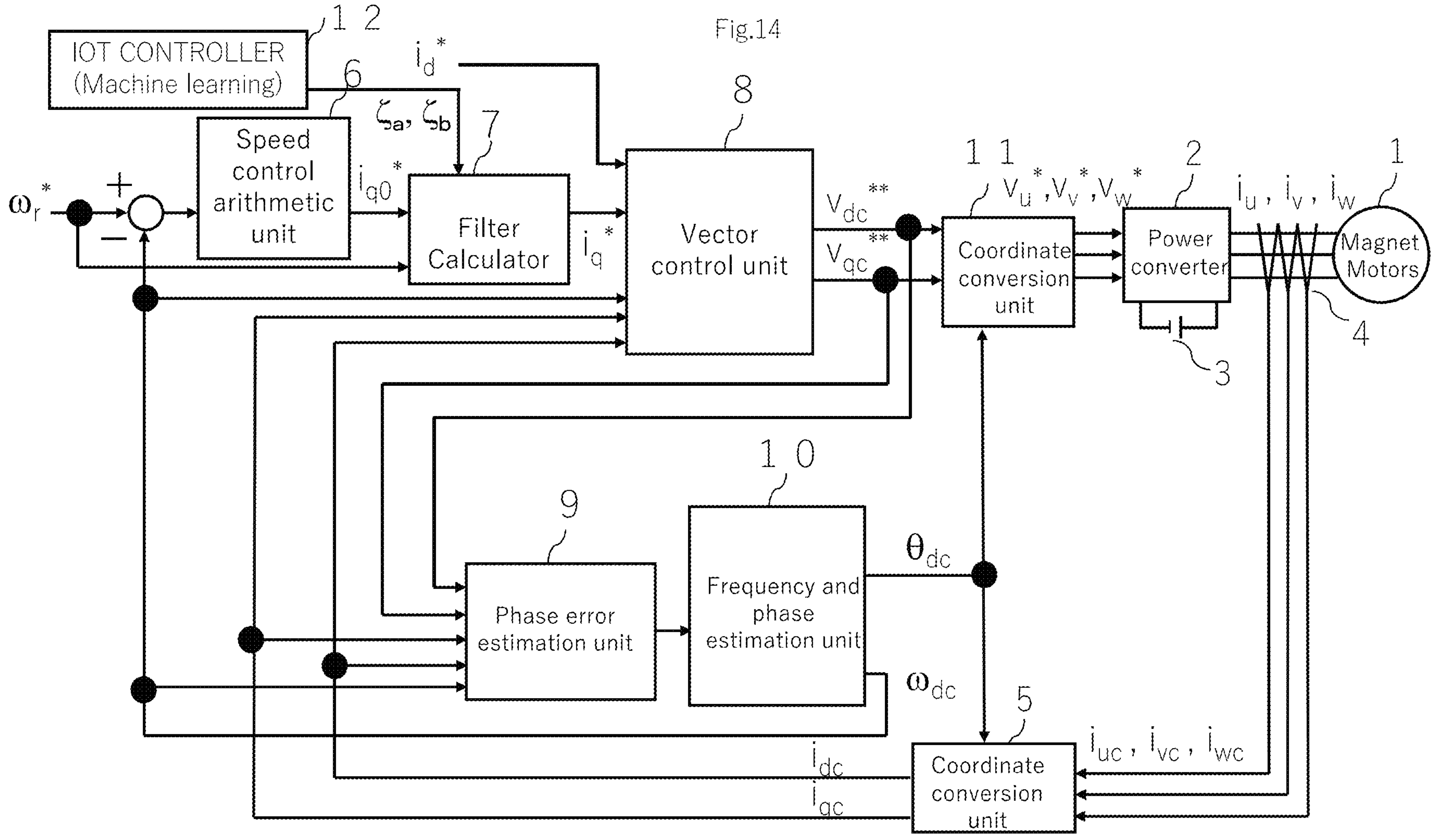
Fig.14
IOT CONTROLLER (Machine learning)
12
6
Speed control arithmetic unit
7
Filter Calculator
8
Vector control unit
11
Coordinate conversion unit
2
Power converter
1
Magnet Motors
4
3
9
Phase error estimation unit
10
Frequency and phase estimation unit
5
Coordinate conversion unit
$\omega_r^*$
+
−
$i_{q0}^*$
$\zeta_a, \zeta_b$
$i_d^*$
$i_q^*$
$V_{dc}^{**}$
$V_{qc}^{**}$
$V_u^*, V_v^*, V_w^*$
$i_u, i_v, i_w$
$\theta_{dc}$
$\omega_{dc}$
$i_{uc}, i_{vc}, i_{wc}$
$i_{dc}$
$i_{qc}$ 20a
20
20b
1
5
6
7
8
9
10
11
26
27
28
29
30
$\omega_{chg}$
$\omega_c$
$\zeta_a, \zeta_b$

POWER CONVERTER

TECHNICAL FIELD

This invention relates to power converter.

BACKGROUND ART

As for the control of load torque pulsation in compressor systems and the like by position sensor-less control, as described in patent document 1, there is a description of a technique to use the pulsation component extracted by a resonance-type filter that extracts the periodic pulsation component of the difference between the motor speed and the speed command to modify the torque current command that is the speed control output.

CITATION LIST

Patent Document

Patent Documents 1: Japanese unexamined patent publication No. 2006-191737

SUMMARY OF THE INVENTION

Problems to be Solved by the Invention

Patent document 1 suppresses the pulsation of the motor speed by adding the output of the resonant-type filter and the speed control, but it does not consider the control to suppress the torque pulsation.

The purpose of the present invention is to provide a power converter that achieves highly accurate and highly efficient control characteristics by suppressing the pulsation of the motor speed as well as the pulsation of the torque.

One preferred example of the invention is a power converter with a control unit that controls the output frequency, output voltage and output current of the motor, the control unit calculates the first torque current command from the deviation between the speed reference point and speed estimate of the motor, switches to either a control mode that suppresses pulsation of the motor speed or a control mode that suppresses pulsation of the motor torque, and calculates the second torque current command from the first torque current command and the switched control mode.

Effects of the Invention

According to the present invention, the pulsation of the motor speed is suppressed and the pulsation of the torque is suppressed, thereby achieving highly accurate and highly efficient control characteristics.

BRIEF DESCRIPTION OF DRAWINGS

FIG. 14: Configuration diagram of power converter and other components in Example 4.

The following examples will be described in detail using the drawings. Each example described below is not limited to the illustrated examples.

Example 1

Figure 1:
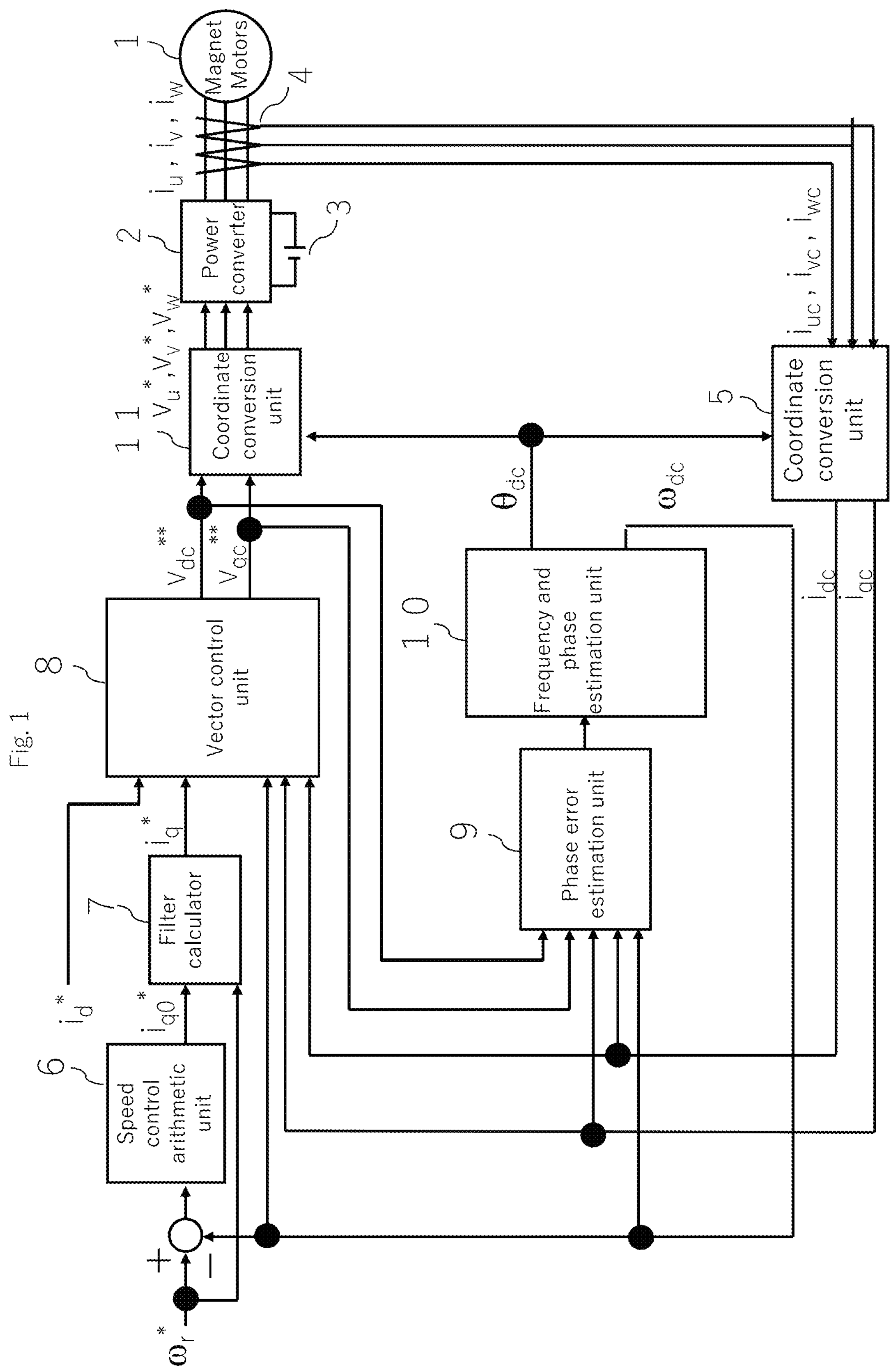
FIG. 1: Configuration diagram of power converter and other components in Example 1.

FIG. 1 shows a configuration diagram of the power converter and magnet motor in Example 1. The power converter in this example is comprising a power converter2, DC power supply3, current detector4, coordinate conversion unit5, speed control arithmetic unit6, filter calculator7, vector control unit8, phase error estimation unit9, frequency and phase estimation unit10, and coordinate conversion unit11.

This example can be applied to control technology that freely suppresses pulsations in motor torque and speed that occur with load torque pulsations that vary with one machine angle rotation when a compressor system is driven by a motor. However, systems to which this example can be applied are not limited to compressor systems.

The magnet motor1 outputs motor torque, which is a composite of the torque component due to the magnetic flux of the permanent magnet and the torque component due to the inductance of the armature winding.

The power converter2 is equipped with semiconductor devices as switching elements. Power converter2 inputs the 3-phase AC voltage reference value $v_u$*, $v_v$*, and $v_w$* and outputs a voltage proportional to the 3-phase AC voltage reference value $v_u$*, $v_v$*, and $v_w$*. Based on the output of power converter2, magnet motor1 is driven and the output voltage, output current, output frequency and output current of magnet motor1 are controlled variably.

DC power supply3 supplies DC voltage to power converter2.

The current detector4 outputs $i_{uc}$, $i_{vc}$ and $i_{wc}$, which are the detected AC currents $i_u$, $i_v$ and $i_w$ of the three phases of magnet motor1. The current detector4 may also detect the AC currents of two of the three phases of magnet motor1, e.g., phase u and phase w, and the AC current of phase v may be obtained from the AC condition ($i_u+i_v+i_w=0$) as $i_v=-(i_u+i_w)$. In this example, the current detector4 is shown in the power converter, but it may be installed outside the power converter.

The control section is equipped with coordinate conversion unit5, speed control arithmetic unit6, filter calculator7, vector control unit8, phase error estimation unit9, frequency and phase estimation unit10, and coordinate conversion unit11. The control unit controls the output of power converter2 so that the output voltage value, output frequency value and output current of magnet motor1 are variable.

The control section is composed of semiconductor integrated circuits (arithmetic and control means) such as micon (microcomputer) or DSP (digital signal processor). Any or all of the control section can be composed of hardware such as an ASIC (Application Specific Integrated Circuit) or FPGA (Field Programmable Gate Array). The CPU (Central Processing Unit) of the control section reads a program held in a memory or other recording device and executes the processing of each part such as the coordinate conversion unit5 described above.

Next, each component of the control unit is described.

Coordinate conversion unit 5 outputs d-axis and q-axis current detection values $i_{dc}$ and $i_{qc}$ from the detected values $i_{uc}$, $i_{vc}$ and $i_{wc}$ of the three phase AC currents $i_u$, $i_v$ and $i_w$ and the phase estimate $\theta_{dc}$.

The speed control arithmetic unit 6 calculates and outputs the first torque current command $i_{q0}$* based on the deviation between the speed reference point $\omega_r$* and the speed estimate $\omega_{dc}$.

The filter calculator7 outputs second torque current command $i_q$* calculated based on the first torque current command $i_{q0}$* and speed reference point $\omega_r$* and the second order transfer function filter of Laplace operator s.

The vector control unit 8 outputs d-axis and q-axis voltage reference value $v_{dc}$ and $v_{qc}$ calculated based on d-axis and q-axis current reference values $i_d$*, $i_q$* current detection values $i_{dc}$, $i_{qc}$ speed estimate $\omega_{dc}$ and magnet motor1 electrical circuit parameters.

The phase error estimation unit9 outputs the phase $\theta_{dc}$ of control axes, the estimated value $\Delta\theta_c$ of the phase error $\Delta\theta$, which is the deviation from the magnet motor1 magnet phase $\theta_d$ by using the voltage reference value $v_{dc}$, $v_{qc}$ for the control axes $d_c$ and $q_c$, speed estimate $\omega_{dc}$, current detection values $i_{dc}$, $i_{qc}$ and electrical circuit parameters of magnet motor1.

The frequency and phase estimation unit10 outputs the speed estimate $\omega_{dc}$ and phase estimate $\theta_{dc}$ based on the estimated low-speed phase error $\Delta\theta_c$.

The coordinate conversion unit11 outputs the voltage reference value $v_u$*, $v_v$*, and $v_w$* for 3-phase AC from the voltage reference value $v_{dc}$ and $v_{qc}$ for the $d_c$ and $q_c$ axes and phase estimate $\theta_{dc}$ First, the basic operation of sensor-less vector control when using the filter calculator 7** in this example is described.

The speed control arithmetic unit 6 calculates the current command $i_{q0}$* of the first q-axis according to (Formula 1) by proportional control and integral control so that the speed estimate $\omega_r$^follows the speed reference point $\omega_r$*.

[Number of 1]

$$i_{q0}^{*} = (\omega_r^{*} - \omega_r^{\wedge})\left(K_{sp} + \frac{K_{si}}{S}\right) \quad (1)$$

where, $K_{sp}$ is the proportional gain of the speed control and $K_{si}$ is the integral gain of the speed control.

Figure 2:
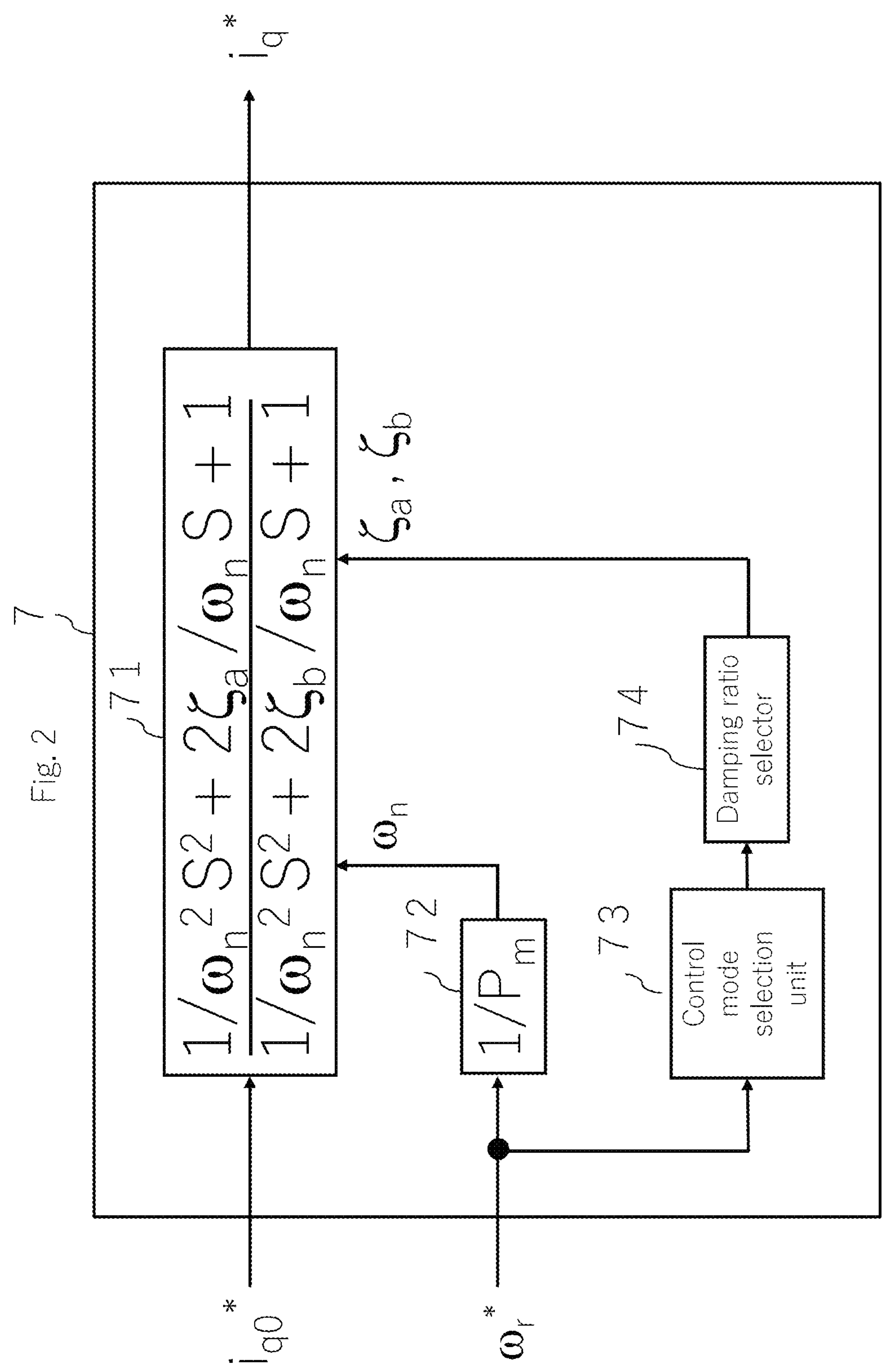
FIG. 2: Configuration diagram of the filter calculator in Example 1.

The filter calculator 7 is described below. FIG. 2 shows the block of filter calculator 7. The filter calculator 7 has a secondary transfer function filter 71 of Laplace operator s, a machine speed conversion section 72, a control mode selection unit 73, and a damping ratio selector 74. Using the current command $i_{q0}$* of the first q-axis, the pulsation component on which is the machine speed of magnet motor1 and the damping ratio parameters $\zeta_a$ and $\zeta_b$, the secondary transfer function filter 71 calculates the second torque current command $i_q$* according to (Formula 2).

[Number of 2]

$$i_q^{*} = \frac{1/\omega_n s^2 + 2\zeta_a/\omega_n s + 1}{1/\omega_n s^2 + 2\zeta_b/\omega_n s + 1} i_{q0}^{*} \quad (2)$$

The machine speed conversion section 72 calculates the pulsation component $\omega_n$, which is the value of the pole logarithm $P_m$ of magnet motor1 and is set in the secondary transfer function filter 71 according to (Formula 3).

[Number of 3]

$$\omega_n = \frac{1}{P_m}\omega_r^{*} \quad (3)$$

The control mode selection unit 73 judges the low-speed range, medium-speed range and high-speed range according to the magnitude of the speed command $\omega_r$*. When it judges the low-speed range, it selects either "control mode to suppress speed pulsation" for magnet motor1, and "control mode to suppress torque pulsation" for the medium- to high-speed range.

When the "control mode to suppress pulsation of speed" is selected, the damping ratio selector 74 sets the damping ratio parameters $\zeta_a$ and $\zeta_b$ related to the control to suppress pulsation of speed. When "control mode to suppress torque pulsation" is selected, the damping ratio parameters $\zeta_a$ and $\zeta_b$ related to the control to suppress torque pulsation shall be set. The damping ratio parameter $\zeta_a$ is the coefficient of the primary component of the Laplace operator of the numerator term of the secondary transfer function filter 71. The damping ratio parameter $\zeta_b$ is the coefficient of the linear component of the Laplace operator of the denominator term of the secondary transfer function filter.

Figure 3:
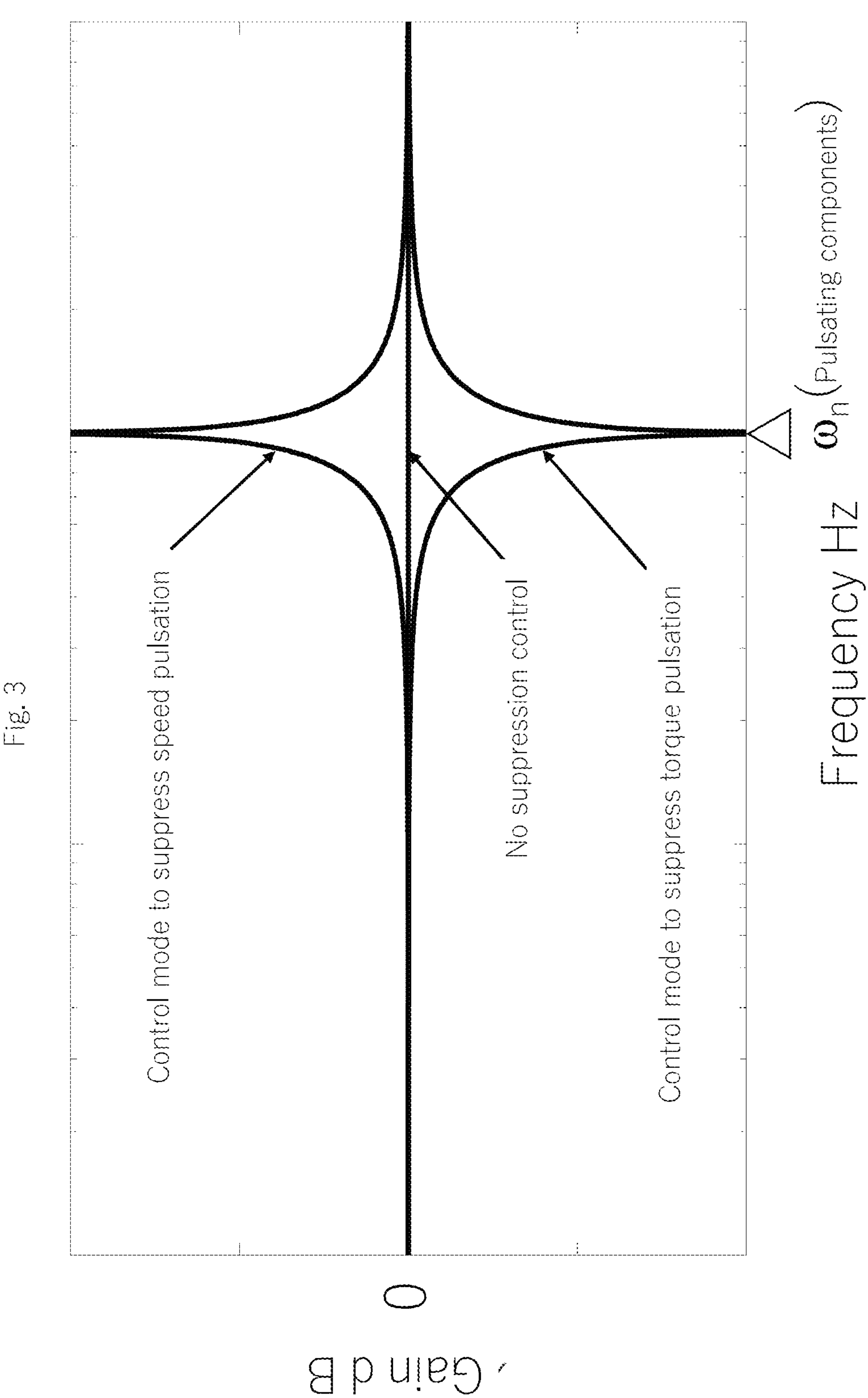
FIG. 3: Frequency characteristics of the two suppression control modes in Example 1.

FIG. 3 shows the frequency characteristics of the two suppression control modes in Example 1. When "control mode to suppress pulsation of speed" is selected, the gain is set so that the gain becomes maximum at the pulsation component on $\omega_n$. On the other hand, when "control mode to suppress torque pulsation" is selected, the gain is set so that the gain becomes minimum in the pulsation component on $\omega_n$. This characteristic can be obtained by setting the damping ratio parameters $\zeta_a$ and $\zeta_b$.

The vector control unit8 outputs the voltage reference values $v_{dc}$*, $v_{qc}$* for the $d_c$ and $q_c$ axes according to (Formula 4) by using firstly determines the electrical circuit parameters of the permanent magnet motor1, such as the winding resistance set value R*, the d-axis inductance set value $L_d$*, the q-axis inductance set value $L_q$*, the induced voltage coefficient value $K_e$*, the current reference values $i_d$*, $i_q$* for the $d_c$ and $q_c$ axes and speed estimate $\omega_{dc}$.

[Number of 4]

$$\begin{bmatrix} v_{dc}^{*} = R^{*} i_d^{*} - \omega_{dc} L_q^{*} \frac{1}{1 + T\,acr\,s} i_q^{*} \\ v_{qc}^{*} = R^{*} i_q^{*} + \omega_{dc}\left(L_d^{*} \frac{1}{1 + T\,acr\,s} i_d^{*} + K_e^{*}\right) \end{bmatrix} \quad (4)$$

where, $T_{acr}$ is the response time constant of the current control.

Second, the vector control unit 8 calculates the voltage correction values $\Delta v_{dc}$ and $\Delta v_{qc}$ for the $d_c$ and $q_c$ axes according to (Formula 5) by using proportional and integral control so that the current reference values $i_d$* and $i_q$* for the $d_c$ and $q_c$ axes follow the current detection values $i_{dc}$ and $i_{qc}$ for each component.

[Number of 5]

$$\begin{bmatrix} \Delta v_{dc} = \left(K_{pd} + \frac{K_{id}}{s}\right)(i_d^* - i_{dc}) \\ \Delta v_{qc} = \left(K_{pq} + \frac{K_{iq}}{s}\right)(i_q^* - i_{qc}) \end{bmatrix} \tag{5}$$

where, $K_{pd}$ is the proportional gain of current control on the $d_c$ axis, $K_{id}$ is the integral gain of current control on the $d_c$ axis, $K_{pq}$ is the proportional gain of current control on the $q_c$ axis, and $K_{iq}$ is the integral gain of current control on the $q_c$ axis.

Furthermore, according to (Formula 6), vector control unit 8 calculates the voltage reference value $v_{dc}$ and $v_{qc}$** for the $d_c$ and $q_c$ axes.

[Number of 6]

$$\begin{bmatrix} v_{dc}^{**} = v_{dc}^* + \Delta v_{dc} \\ \Delta v_{qc}^{**} = v_{qc}^* + \Delta v_{qc} \end{bmatrix} \tag{6}$$

The phase error estimation unit 9 calculates the estimated phase error $\Delta\theta_c$ according to the extended induced voltage equation (Formula 7) based on the voltage reference value $v_{dc}$, $v_{qc}$, current detection values $i_{dc}$, $i_{qc}$ for the $d_c$ and qc axes and electrical circuit parameters (R*, $L_q$*) of magnet motor1.

[Number of 7]

$$\Delta\theta_c = \tan^{-1}\left(\frac{v_{dc}^{**} - R^* i_{dc} + \omega_{dc} L_q^* i_{qc}}{v_{qc}^{**} - R^* i_{qc} - \omega_{dc} L_q^* i_{dc}}\right) \tag{7}$$

The frequency and phase estimation unit 10 calculates the speed estimate $\omega_{dc}$ according to (Formula 8) by P (proportional)+I (integral) control so that the estimated phase error value $\Delta\theta_c$ follows the command value $\Delta\theta_c$ (=0). Then, the phase estimate value $\theta_{dc}$ is calculated according to (Formula 9) by I (integral) control.

[Number of 8]

$$\omega_{dc} = \left(Kp_{p11} + \frac{Ki_{p11}}{s}\right)(\Delta\theta_c^* - \Delta\theta_c) \tag{8}$$

[Number of 9]

$$\theta\,\mathrm{dc} = \frac{1}{s} \cdot \omega_{dc} \tag{9}$$

where, $Kp_{pll}$ is the proportional gain of the PLL control and $Ki_{pll}$ is the integral gain of the PLL control.

Next, the principle of the highly accurate and efficient control characteristics of this example will be explained.

Figure 4:
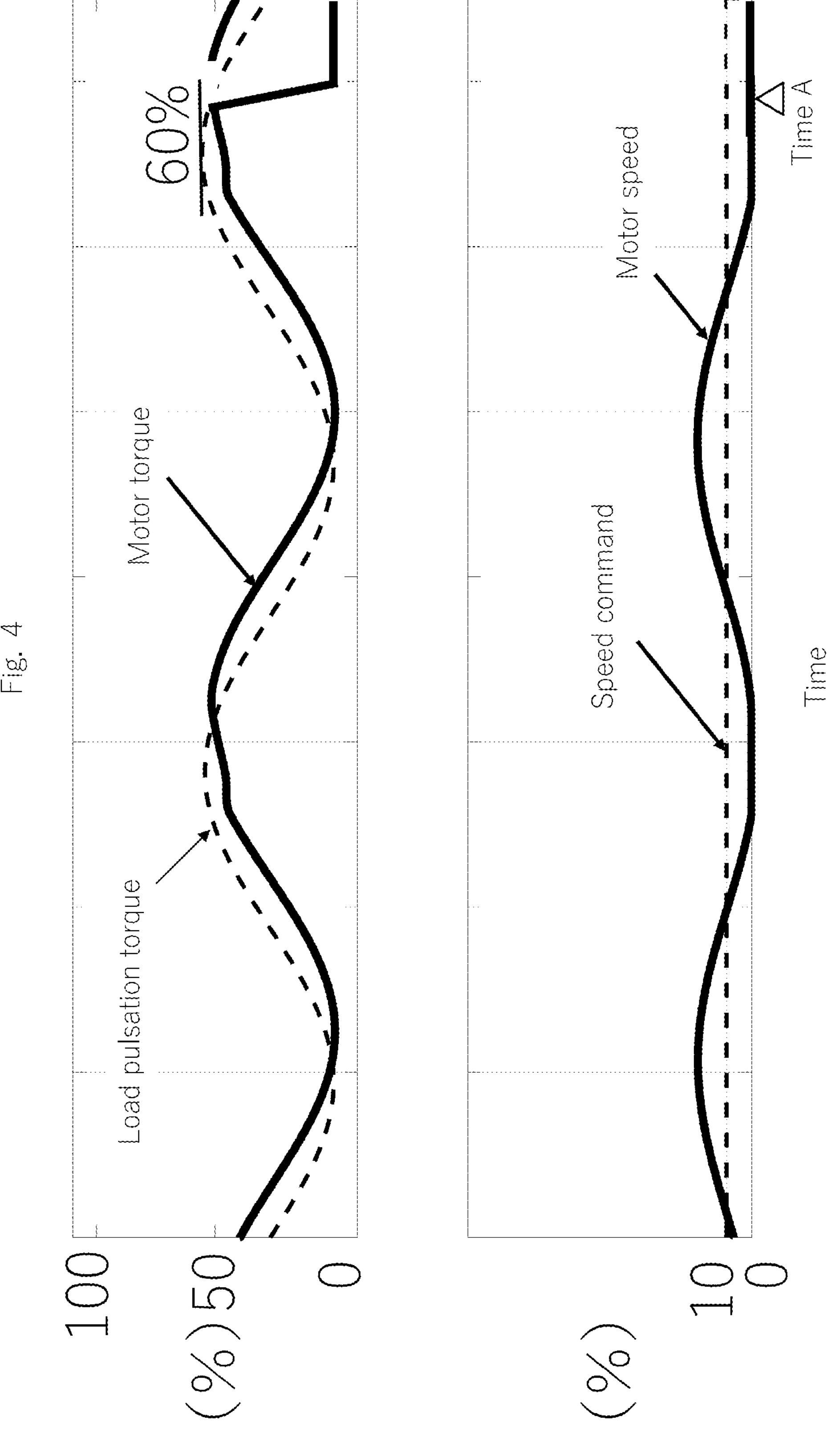
FIG. 4: Control characteristics in the low-speed range in the comparative example.

FIG. 4 shows the control characteristics when load pulsating torque is present in the low-speed range in the comparative example without the filter calculator 7 in this example. The pulsating load torque has a maximum DC component of 50% and a maximum pulsating component of 50%, for a total of 100% load torque applied in a ramped shape.

These are the simulation results when the speed command is set to 10% of the base speed. In FIG. 4, the upper row displays the load pulsation torque and motor torque, and the lower row displays the speed command and motor speed. At this time, the maximum value of the load pulsation torque is about 60%, but the motor speed decelerates to near zero at time A in FIG. 4, and magnet motor 1 steps out and comes to a stop.

Figure 5:
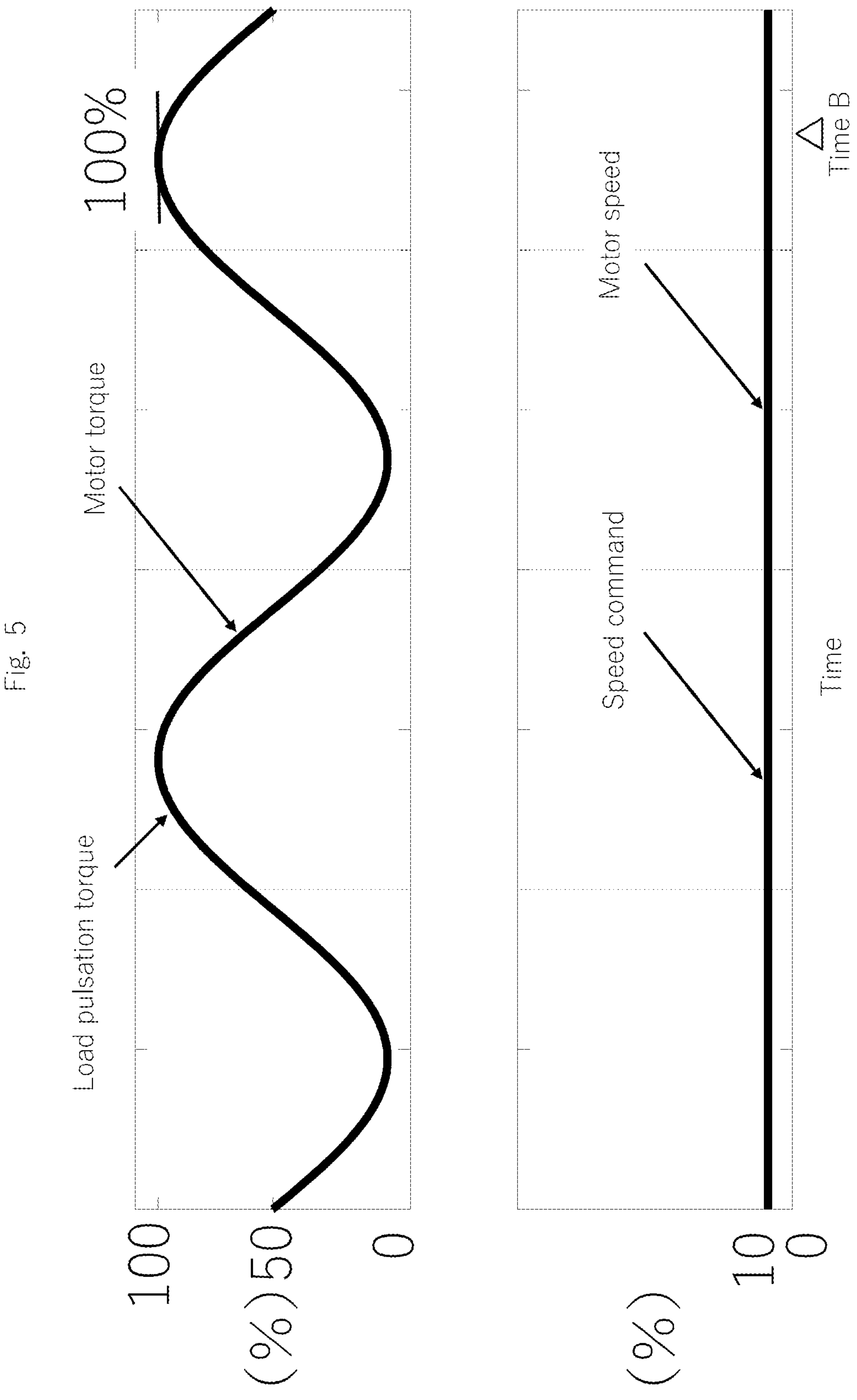
FIG. 5: Control characteristics in the low-speed range when Example 1 is used.

FIG. 5 shows the control characteristics when "control mode to suppress velocity pulsation" is selected using the filter calculator 7 in this example. As in FIG. 4, the simulation results are obtained when the speed command is set to 10% of the base speed.

Although the maximum value of the load pulsation torque increases to 100% at time B, the gain to the pulsation component $\omega_n$ of the speed increases, so the motor torque follows the load pulsation torque and the speed pulsation width can be reduced to almost zero, thus achieving highly accurate operation.

Figure 6:
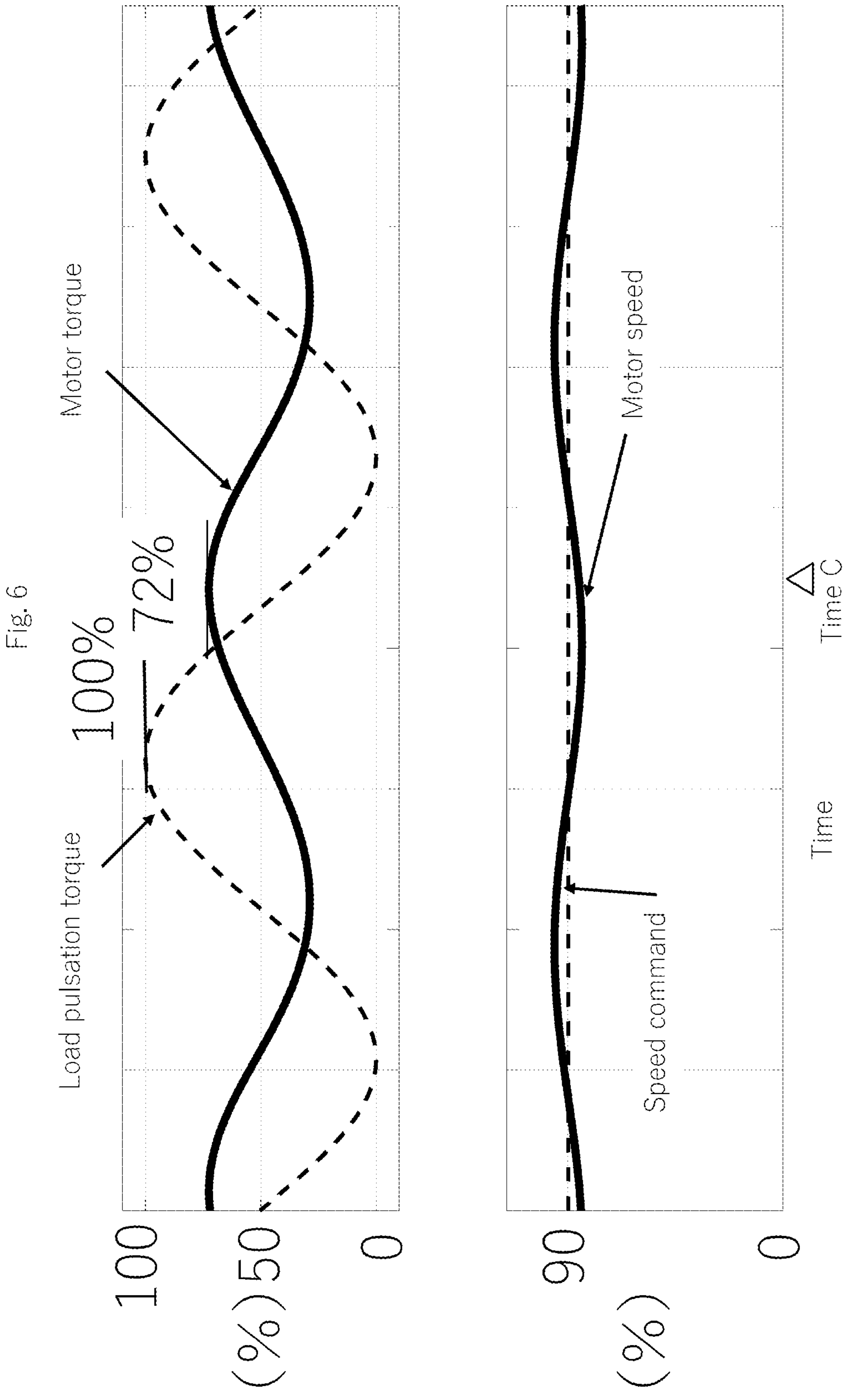
FIG. 6: Control characteristics in the mid- to high-speed range in the comparative example.

FIG. 6 shows the control characteristics when there is load pulsation torque in a comparative example where the filter calculator 7 is not used in this example in the high-speed range. The simulation results are when the speed command is set to 90% of the base speed. In FIG. 6, the upper row shows the load pulsation torque and motor torque, and the lower row shows the speed command and motor speed. As the speed increases in the high speed range, the pulsation of the motor torque decreases compared to the low speed range shown in FIG. 4. This is determined by the control bandwidth of the speed control arithmetic unit 6.

Due to the pulsating load torque, the maximum value of the motor torque at time C in FIG. 6 is about 72%. At this time, the motor output P is generated by the motor speed or and torque $\tau_m$ in the relationship of (Formula 10), so the pulsation of the motor output P is large at high speeds and the motor efficiency is not good.

[Number of 10]

$$P = \omega_r \cdot \frac{1}{P_m} \cdot \tau_m \tag{10}$$

Figure 7:
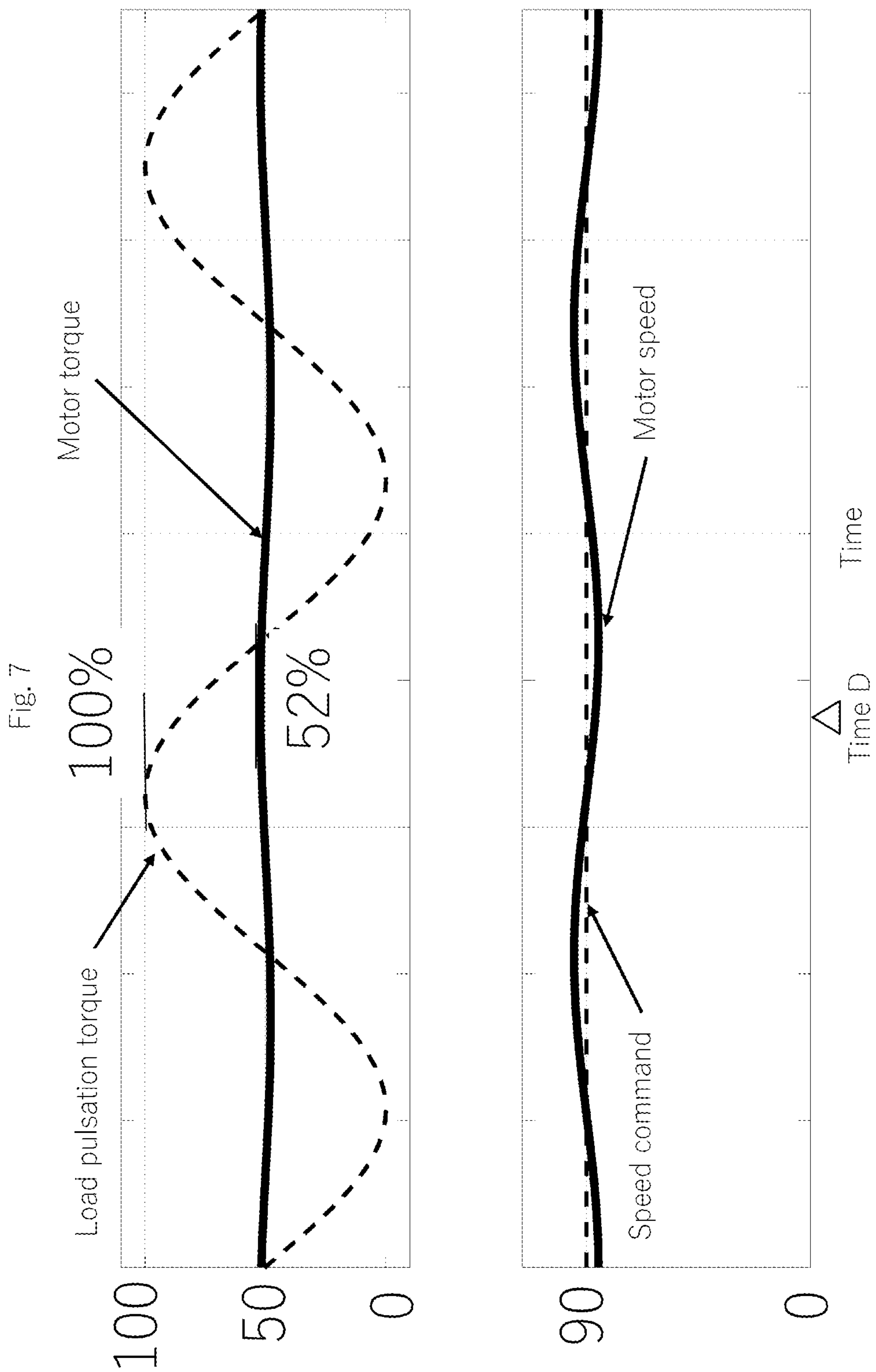
FIG. 7: Control characteristics in the mid- to high-speed range when Example 1 is used.

FIG. 7 shows the control characteristics when "control mode to suppress torque pulsation" is selected using the filter calculator 7 in this example. As in FIG. 6, this is the simulation result when the speed command is set to 90% of the base speed. To reduce the gain for the pulsation component $\omega_n$ of the speed, the maximum value of the motor torque is 52%. Compared to FIG. 6, the torque pulsation width is significantly reduced from 22% (=72-50) to 2% (=52-50), resulting in smaller pulsation of the motor output P and high-efficiency operation can be achieved.

The effect of the invention is evident by selecting "control mode to suppress speed pulsation" in the low speed range and "control mode to control torque pulsation" in the high speed range.

This example shows the control characteristics when the magnitude of the speed command $\omega_r$* is 10% and 90% of the base speed as an example, but the range where magnet motor 1 steps out due to load pulsation torque may be considered the low-speed range, and the range above that may be considered the medium-high-speed range. Furthermore, the low-speed and medium-high-speed ranges may be determined unambiguously by the magnitude of the speed command. If the damping ratio parameters $\zeta_a$, $\zeta_b$ described above are changed according to the magnitude of the speed command $\omega_r$*, the pulsation width of the motor speed $\omega_r$ and the motor torque $t_m$ can be intentionally controlled.

Figure 8:
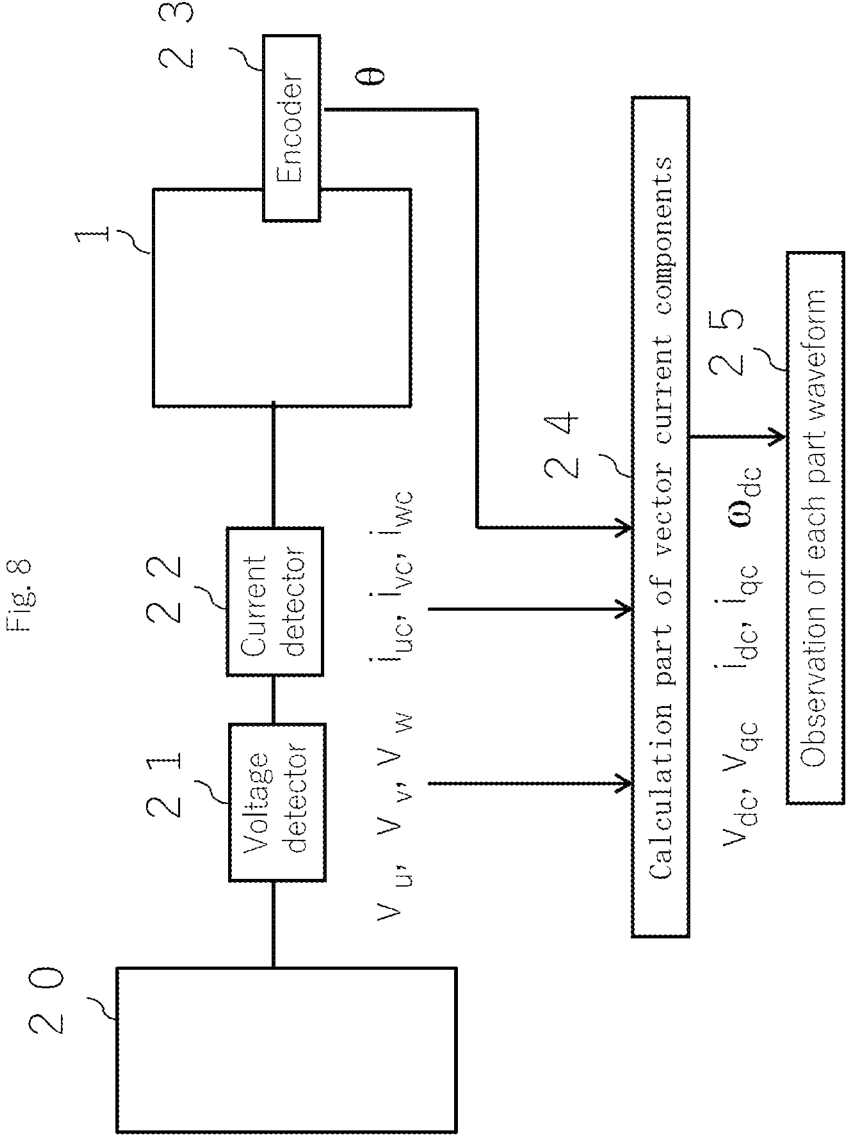
FIG. 8: This figure explains the verification when this example is employed.

Here, the verification method when this example is adopted is explained using FIG. 8. Voltage detector 21 and current detector 22 are attached to power converter 20, which drives magnet motor 1, and to the shaft of magnet motor 1, an encoder 23 is attached to the shaft of magnet motor1.

The calculation part of vector current components 24 is input voltage detection values ($v_{uc}$, $v_{v\ c}$, $v_{wc}$) of three-phase AC and current detection values ($i_{uc}$, $i_{v\ c}$, $i_{wc}$) of three-phase AC which are outputs of voltage detector 21, and the position θ, which is the encoder output, and calculates the vector voltage components $v_{dc}$, $v_{qc}$, vector current components $i_{dc}$, $i_{qc}$ and velocity detection value $\omega_{rc}$ obtained by differentiating the position θ is calculated.

The speed command $\omega_r$* given to the controller of power converter2 is set to the low speed range, and the compressor with the built-in magnet motor1 is drive.

Figure 9:
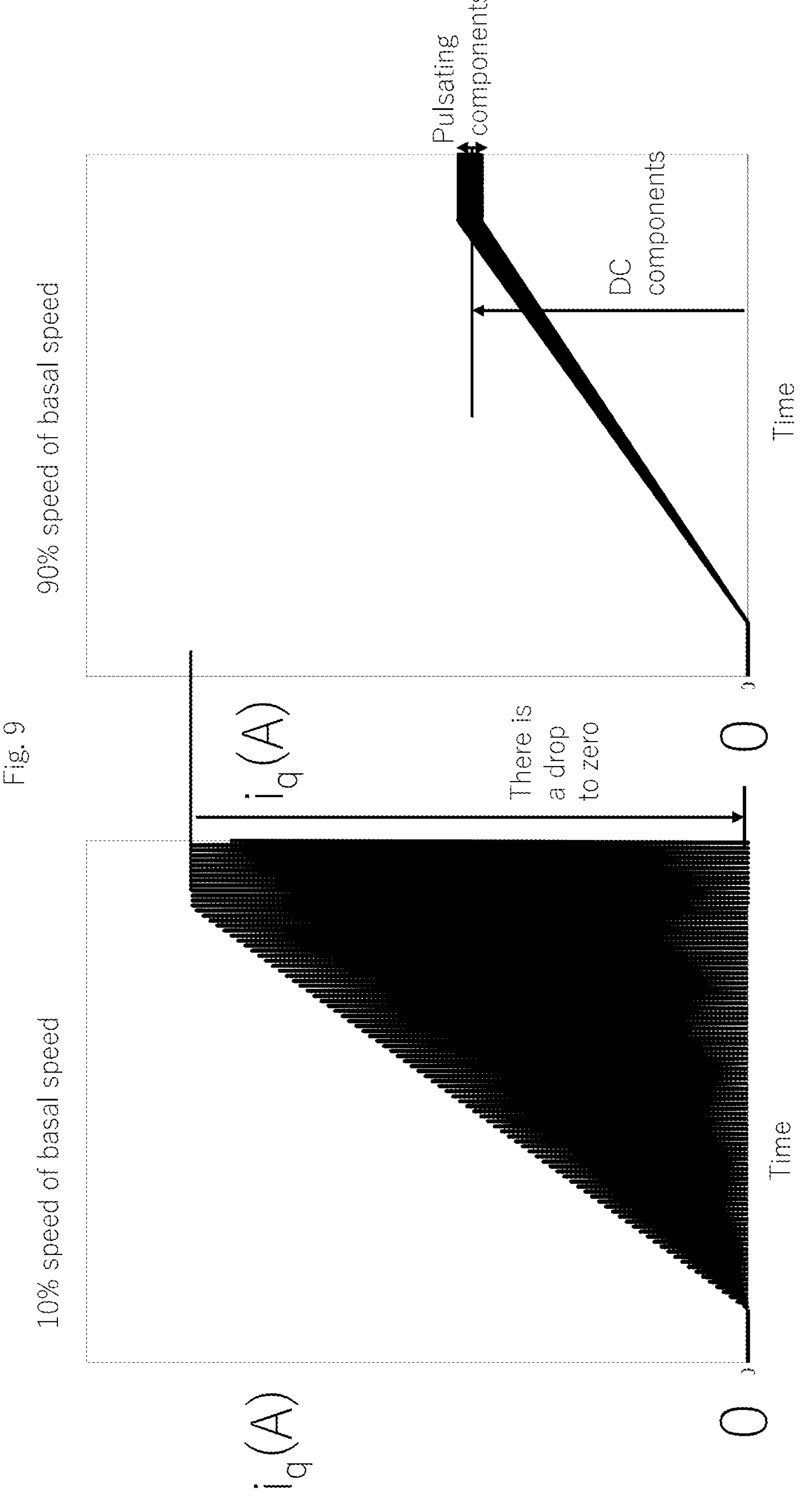
FIG. 9: Current waveform of the q-axis when this example is employed.

FIG. 9 shows the current waveform of the q-axis when this example is employed. The waveform of the vector current component $i_{qc}$ in the low-speed range is shown in the left figure of FIG. 9. Since the vector current component $i_{qc}$ in the low-speed range is proportional to the load pulsation torque, the vector current component $i_{qc}$ is a waveform that decreases to almost zero.

Next, the speed command $\omega_r$* given to the controller of power converter2 is set to the medium to high speed range, and the compressor with built-in magnet motor1 is driven. The waveform of the vector current component $i_{qc}$ in the medium to high speed range is shown in the right figure of FIG. 9. Since the vector current component $i_{qc}$ in the high speed range becomes independent of the load pulsation torque, $i_{qc}$ becomes almost a DC component, and the pulsation component is less than 10% of the DC component.

If the magnitude of the speed command is set at every 10% of the base speed and a similar test is performed, the state of the control mode, such as "control mode to suppress pulsation of speed," "control mode to suppress pulsation of torque," or when the function of the secondary transfer function filter 71 is turned off, will become obvious. The above observed the waveform of the vector current component $i_{qc}$, but the waveform of the velocity detection value $\omega_{rc}$ may be observed.

Example 2

Figure 10:
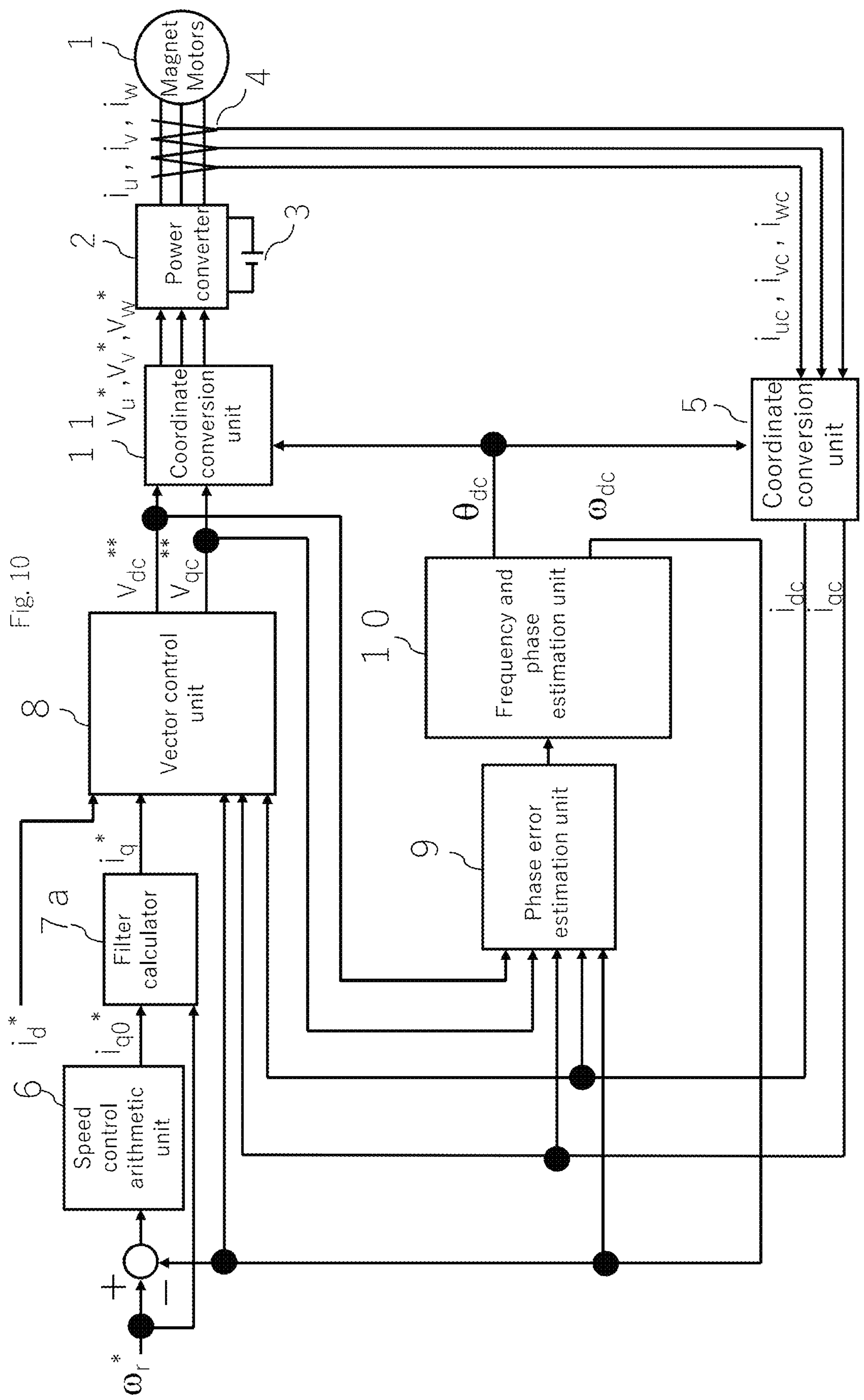
FIG. 10: Configuration diagram of power converter and other components in Example 2.

FIG. 10 shows the configuration of the power converter and magnet motor in Example 2. In Example 1, the damping ratio parameters $\zeta_a$ and $\zeta_b$ set in the secondary transfer function filter 71 of filter calculator 7 are configured to switch between "control mode to suppress speed pulsation" in the low speed range and "control mode to suppress torque pulsation" in the medium and high speed ranges using the speed command.

In this example, two secondary transfer function filters 7$a$1 and 7$a$5 are provided in filter calculator 7$a$, and each is switched between low-speed and medium-high-speed regions.

The magnet motor 1 to speed control arithmetic unit 6 and vector control unit 8 to coordinate conversion unit 11 in FIG. 10 are the same as the components with the same symbols in FIG. 1.

Figure 11:
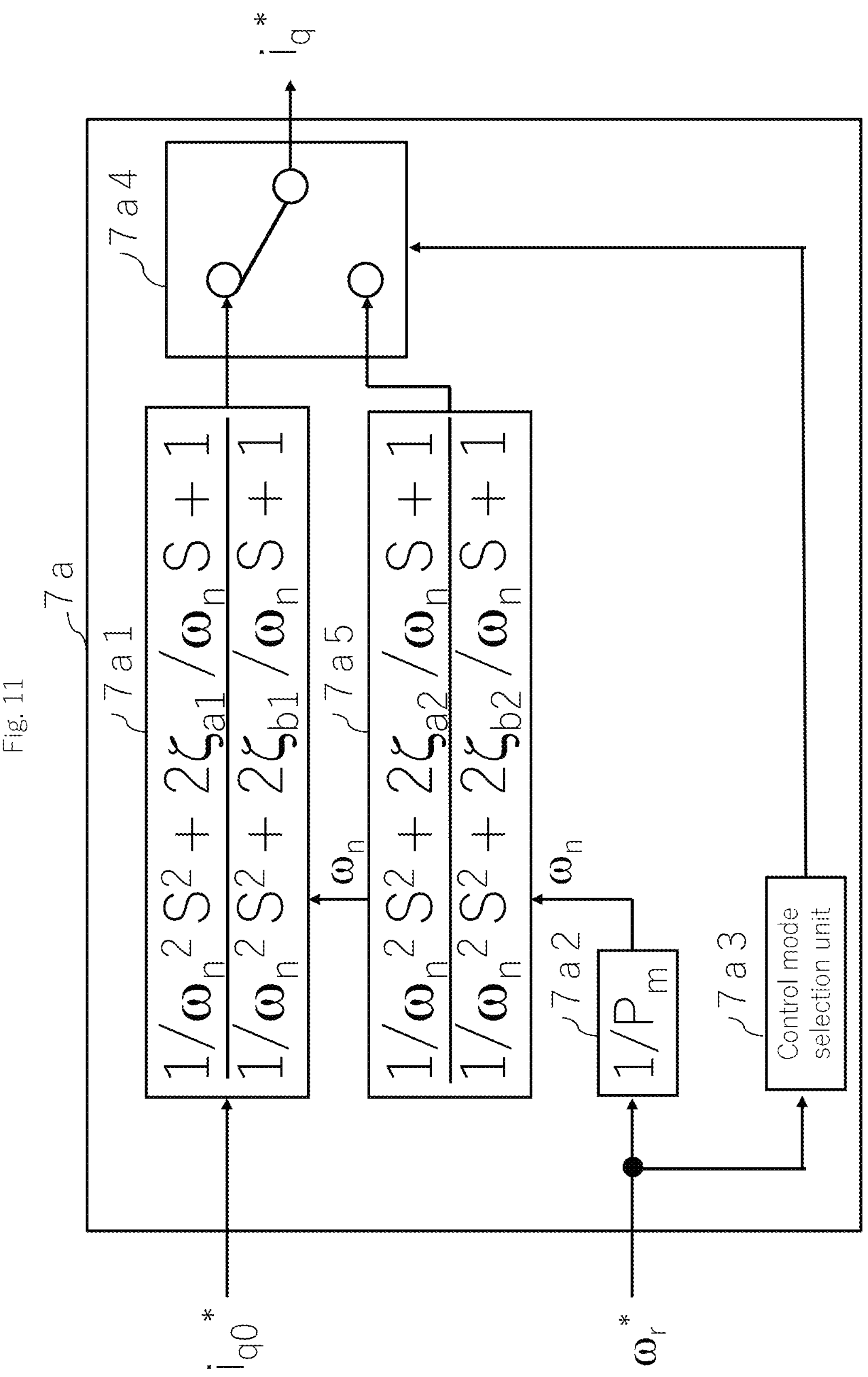
FIG. 11: Configuration diagram of the filter calculator in Example 2.

FIG. 11 shows the block of filter calculator 7$a$ in Example 2. filter calculator 7$a$ uses the current command $i_{q0}$* of the first q-axis, the pulsation component on $\omega_n$, the damping ratio parameters $\zeta_{a1}$ and $\zeta_{b1}$ of the "control mode to suppress velocity pulsation", the Laplace operator s secondary transfer function filter 7$a$1 calculates the second torque current command $i_{q\ 1}$* according to (Formula 11).

[Number of 11]

$$i_{q1}^* = \frac{1/\omega_n s^2 + 2\zeta_{a1}/\omega_n s + 1}{1/\omega_n s^2 + 2\zeta_{b1}/\omega_n s + 1} i_{q0}^* \tag{11}$$

Furthermore, using the first q-axis current command $i_{q0}$*, the pulsation component on $\omega_n$, and the damping ratio parameters $\zeta_{a2}$ and $\zeta_{b2}$ of the "control mode to suppress torque pulsation", the secondary transfer function filter 7$a$5 calculates the second torque current command $i_{q\ 2}$* according to (Formula 12).

[Number of 12]

$$i_{q2}^* = \frac{1/\omega_n s^2 + 2\zeta_{a2}/\omega_n s + 1}{1/\omega_n s^2 + 2\zeta_{b2}/\omega_n s + 1} i_{q0}^* \tag{12}$$

The machine speed conversion section 7$a$2 calculates the pulsation component on $\omega_n$, which is the value of the pole logarithm $P_m$ of magnet motor1 and is set in the secondary transfer function filters 7$a$1 and 7$a$5, according to (Formula 3) above.

The control mode selection unit 7$a$3 judges the low-speed range and medium-high-speed range by the magnitude of the speed reference point $\omega_r$*. When it judges that the speed is in the low-speed range, it selects "control mode to suppress speed pulsation" and when it judges that the speed is in the medium-high-speed range, it selects "control mode to suppress torque pulsation" respectively.

When "control mode to suppress pulsation of speed" is selected in the control mode selection unit 7$a$3, the filter switching section 7$a$4 outputs $i_{q\ 1}$*, which is the output of secondary transfer function filter 7$a$1, as current command $i_q$* of the q-axis. When "control mode to suppress torque pulsation" is selected in the control mode selection unit 7$a$3, the filter switching section 7$a$4 outputs $i_{q\ 2}$*, which is the output of the secondary transfer function filter 7$a$5, as the current command $i_q$* of the q-axis As in Example 1, highly accurate and highly efficient control characteristics can be achieved by using this example, in which two secondary transfer function filters are prepared and switched in the low-speed and medium-high-speed ranges.

Example 3

Figure 12:
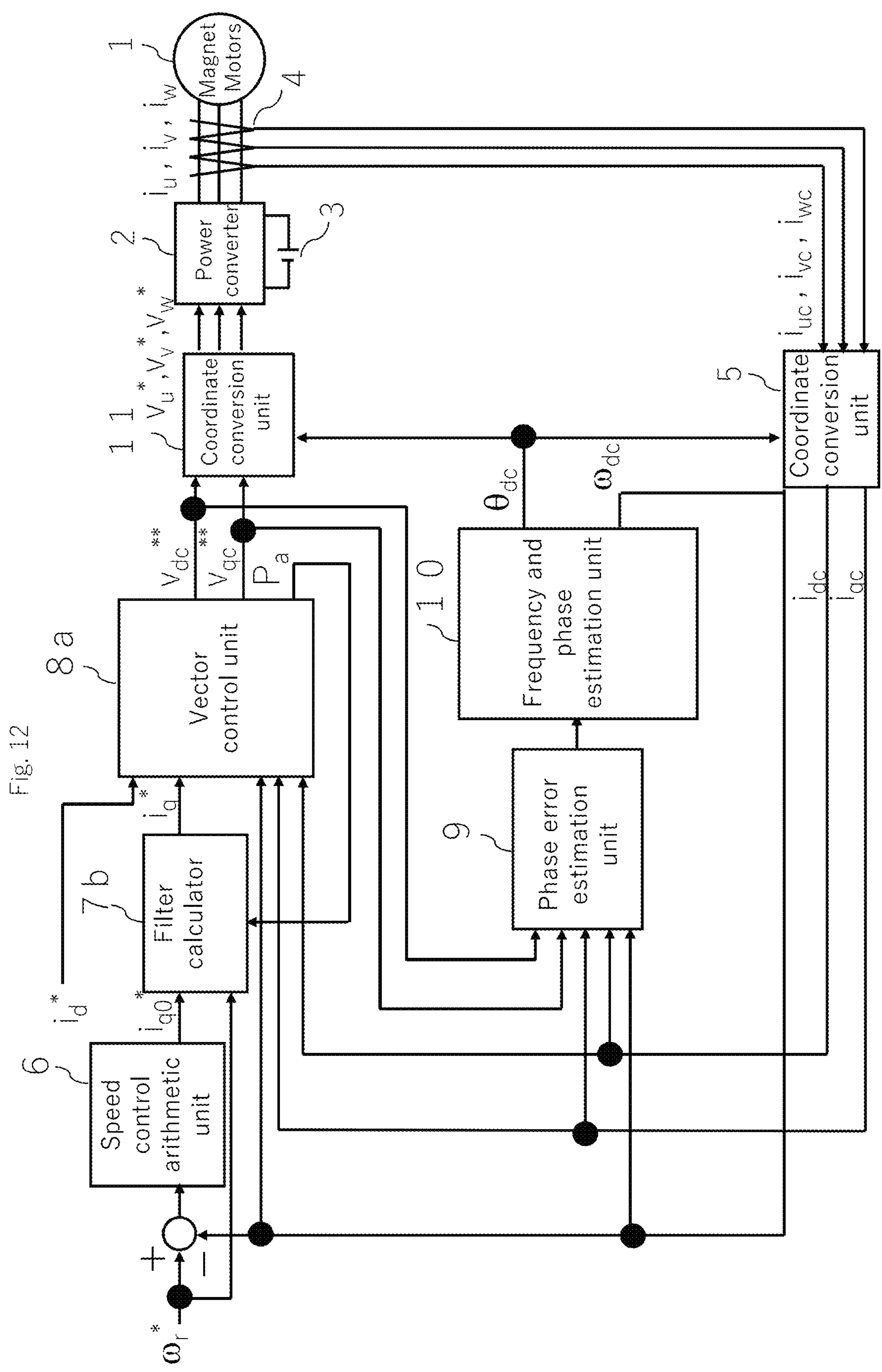
FIG. 12: Configuration diagram of power converter and other components in Example 3.

FIG. 12 shows the configuration of the power converter and magnet motor in Example 3. In Example 1, the damping ratio parameters $\zeta_a$ and $\zeta_b$ set in the secondary transfer function filter 71 of filter calculator 7 are configured to switch between the "control mode to suppress speed pulsation" in the low-speed range and the "control mode to suppress torque pulsation" in the high-speed range using the speed command.

In this example, the configuration is switched in "control mode to suppress pulsation of speed" in the low power range and "control mode to suppress pulsation of torque" in the medium to high power range using power value. The magnet motor1 to speed control arithmetic unit 6 and phase error estimation unit 9 to coordinate conversion unit 11 in FIG. 12 are identical to the components with the same codes in FIG. 1.

The vector control unit 8*a* calculates the effective power Pa, which is the inner product of the power of magnet motor 1, according to (Formula 13), in addition to the calculations in (Formula 4) to (Formula 6).

[Number of 13]

$$P_a = v_{dc}^{} \cdot i_{dc} - v_{qc}^{} \cdot i_{qc} \tag{13}$$

Figure 13:
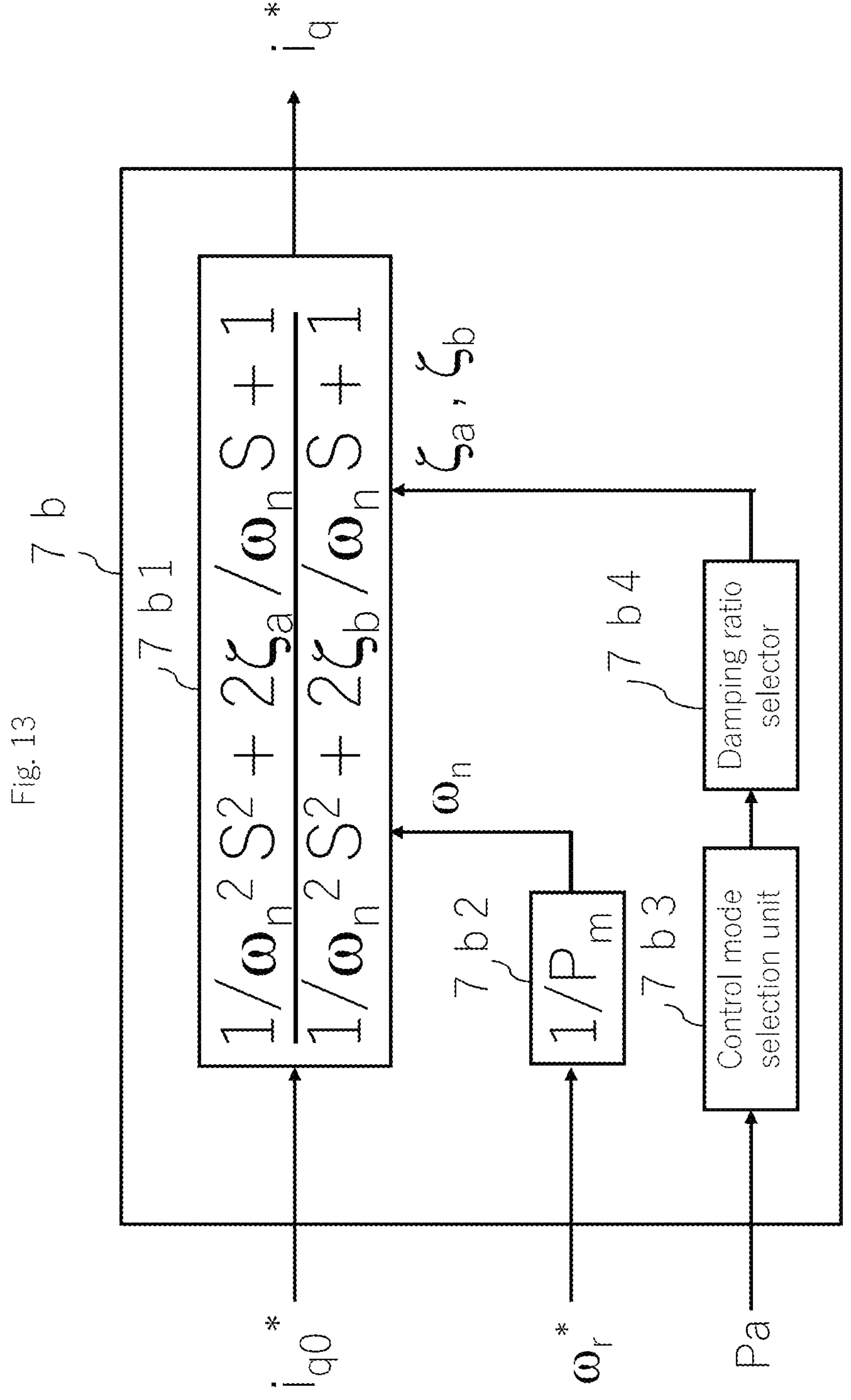
FIG. 13: Configuration diagram of the filter calculator in Example 3.

FIG. 13 shows the block of filter calculator 7*b* in Example 3. Here, the secondary transfer function filter 7*b*1, machine speed converter 7*b*2, and damping ratio selector 7*b*4 are identical to the secondary transfer function filter 71, machine speed converter 72, and damping ratio selector 74 shown in FIG. 2, and this description is omitted.

The control mode selection unit 7*b*3 has a boundary power value to switch between "control mode to suppress pulsation of speed" and "control mode to suppress pulsation of torque". The control mode selection unit 7*b*3 judges the low power range and the medium-high power range according to the magnitude of the effective power Pa. When it determines the low power range, it selects "control mode to suppress pulsation of speed" and when it determines the medium-high power range, it selects "control mode to suppress pulsation of torque".

When the "control mode to suppress pulsation of speed" is selected, the damping ratio selection unit 7*b*4 sets the damping ratio parameters $\zeta_a$ and $\zeta_b$ related to the control to suppress pulsation of speed. When "control mode to suppress torque pulsation" is selected, the current command $i_q$* of the q-axis is calculated by setting the damping ratio parameters $\zeta_a$, $\zeta_b$, related to the control to suppress torque pulsation.

Using this example, which switches between the low-power and medium-high-power ranges, the same high-precision and high-efficiency control characteristics can be achieved as in Example 1.

Here is an example of switching the damping ratio parameters $\zeta_a$ and $\zeta_b$ in the secondary transfer function filter 7*b*1 of filter calculator 7*b* between the low and medium/high power regions. Not limited to this, as in Example 2, two secondary transfer function filters may be equipped and each may be switched for the low power range and for the mid-to-high power range.

Example 4

FIG. 14 shows the configuration of the power converter and magnet motor in Example 4. In Example 1 to Example 3, the controller of the power converter (microcomputer, etc.) is configured with the damping ratio parameters $\zeta_a$ and $\zeta_b$ of the filter calculator, the speed $\omega_{chg}$ to switch between the "control mode to suppress pulsation of speed" and the "control mode to suppress pulsation of torque", or power value to switch between "control mode to suppress speed pulsation" and "control mode to suppress torque pulsation".

In this example, the configuration feeds back the state quantity of the control to a higher-level IoT (Internet Of Things) controller 12, which re-sets the machine-learned values for switching control modes, such as the damping ratio parameters $\zeta_a$ and $\zeta_b$ and the switching speed $\omega_{chg}$ described above, to the controller.

The magnet motor1 to coordinate conversion unit 11 in FIG. 14 are identical to the components with the same code in FIG. 1. The damping ratio parameters $\zeta_a$, $\zeta_b$ and switching speed $\zeta_{chg}$ are calculated by machine learning the state quantities of the control such as voltage reference value, current detection, phase error and estimated speed.

Here, the IOT controller 12 is described as being external to the power converter, but the IOT controller 12 can be incorporated as an internal control unit of the power converter.

This example can be used to achieve higher precision and higher efficiency control characteristics as in Example 1 and without adjustments.

Example 5

Figure 15:
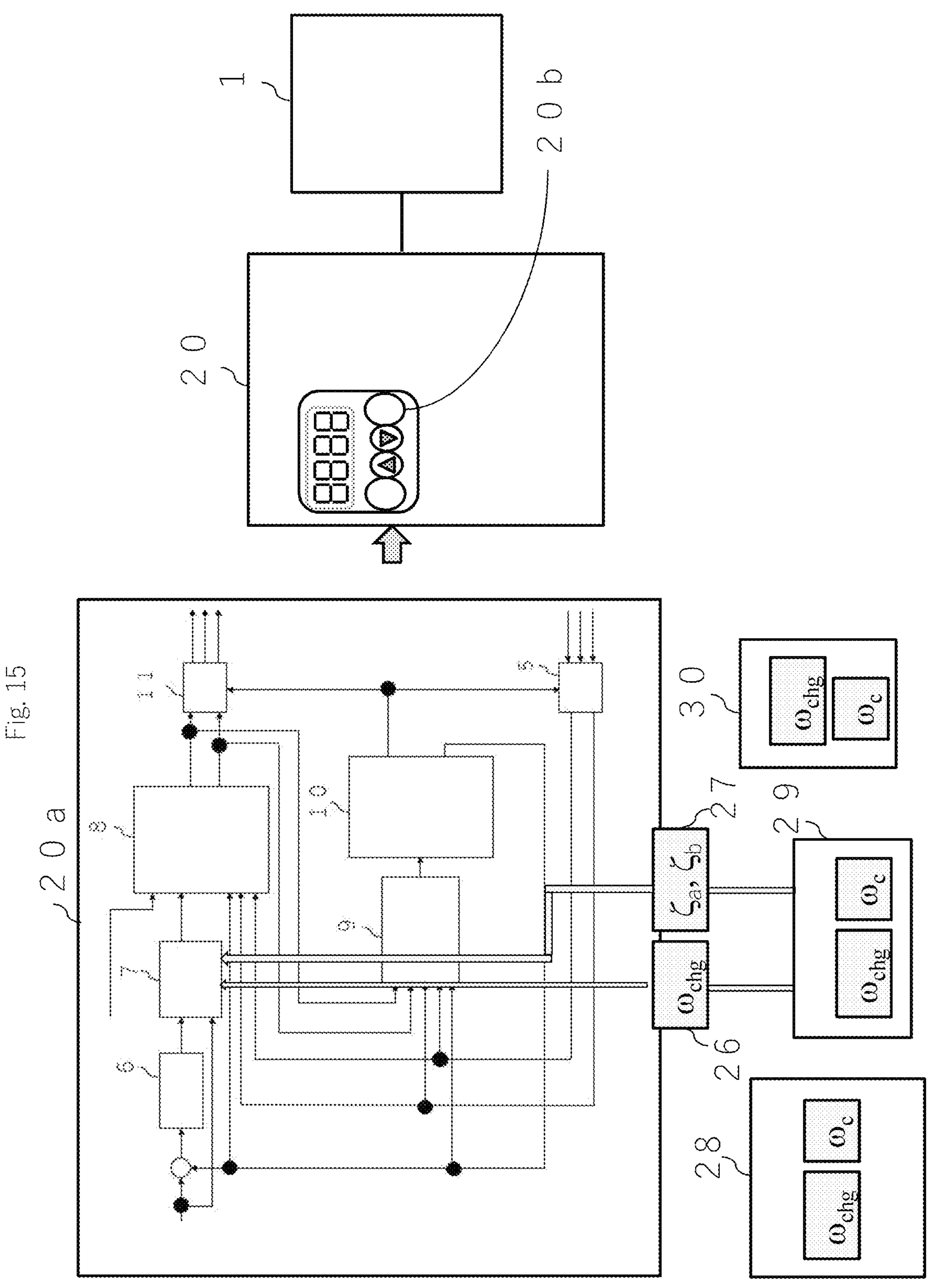
FIG. 15: Configuration diagram of power converter and other components in Example 5.

FIG. 15 shows the configuration of the power converter and magnet motor in Example 5. This example is the application of this example to the magnet motor drive system. In FIG. 15, the components magnet motor 1, coordinate conversion unit 5 to coordinate conversion unit 11 are identical to the components with the same code in FIG. 1.

The magnet motor 1 in FIG. 15 is driven by power converter 20. The power converter20 in this example has the coordinate conversion unit 5 to coordinate conversion unit11 of FIG. 1 as software 20*a*, the power converter 2 of FIG. 1, the DC power supply 3, current detector 4 are implemented as hardware. In addition, values for switching control modes such as "$\omega_{chg}$ which is the switching speed 26 in the low-speed/mid-speed range", and "$\zeta_a$, $\zeta_b$ which is the damping ratio parameter in the low-speed/mid-speed range" in software 20*a* by a host device such as digital operator 20*b*, personal computer 28, tablet 29, or smart phone 30 can be set and changed.

The explanation here is based on the example of "$\omega_{chg}$ which is the switching speed 26 of the low-speed range/mid-speed range", but as in Example 3, the power value for switching between "control mode to suppress pulsation of speed" and "control mode to suppress pulsation of torque" may be set from an external device.

If this example is applied to a compressor system driven by magnet motor, high precision and high efficiency control characteristics can be achieved in position sensor-less vector control. The "$\omega_{chg}$ which is the switching speed 26 in the low-speed/mid-speed range", and the "$\zeta_a$, $\zeta_b$ which is the damping ratio parameter in the low-speed/mid-speed range", may be set on a fieldbus such as a programmable logic controller, a local area network connected to a computer, or an IOT controller.

Furthermore, although Example 1 is used in this example, Examples 2 through 4 may also be used.

In Examples 1 through 5, the voltage correction values $\Delta v_{dc}$ and $\Delta v_{qc}$ were created from the current reference values $i_d$* and $i_q$* and the current detection values $i_{dc}$ and $i_{qc}$, and the calculation shown in (Formula 6) was performed to add these voltage correction values and the voltage reference values for vector control, while the current reference value $i_d$*, $i_q$* and current detection values $i_{dc}$ and $i_{qc}$ to create intermediate current reference values $i_d$ and $i_q$ shown in (Formula 14) for use in the vector control calculation, and then perform the vector control calculation shown in (Formula 15) using speed estimate $\omega_{dc}$ and the electrical circuit parameters of magnet motor 1.

[Number of 14]

$$\begin{bmatrix} i_d^{**} = \left(K_{pd1} + \frac{K_{id1}}{s}\right)(i_d^* - i_{dc}) \\ i_q^* = \left(K_{pq1} + \frac{K_{iq1}}{s}\right)(i_q^* - i_{qc}) \end{bmatrix} \tag{14}$$

[Number of 15]

$$\begin{bmatrix} v_{dc}^{***} = R^* i_d^{**} - \omega_{dc} L_q^* \frac{1}{1+T_q s} i_q^{} \\ v_{qc}^{*} = R^* i_q^{**} + \omega_{dc} L_d^* \frac{1}{1+T_d s} i_d^{} + \omega_{dc} Ke^{} \end{bmatrix} \tag{15}$$

where, $K_{pd1}$ is the proportional gain of current control of the $d_c$-axis, $K_{id1}$ is the integral gain of current control of the $d_c$-axis, $K_{pq1}$ is the proportional gain of current control of the $q_c$-axis, $K_{iq1}$ is the integral gain of current control of the $q_c$-axis, $T_d$ is the electrical time constant of the d-axis ($L_d/R^*$) and $T_q$ is the electrical time constant of the q-axis ($L_q/R^*$).

Alternatively, from current reference values $i_d^*$ and $i_q^*$ and current detection values $i_{dc}$ and $i_{qc}$, voltage correction values $\Delta v_{d\_p}^*$ for the proportional component of $d_c$-axis, $\Delta v_{d\_i}^*$ for the integral component of $d_c$-axis, $\Delta v_{q\_p}^*$ for the proportional component of $q_c$-axis and $\Delta v_{q\_i}^*$ for the integral component of $q_c$-axis to be used for vector control calculation can be created by (Formula 16), and the vector control operation shown in (Formula 17) using the speed estimate $\omega_{dc}$ and the electrical circuit parameters of magnet motor 1 may be performed.

[Number of 16]

$$\begin{bmatrix} \Delta v_{d\_p}^* = K_{pd2}(i_d^* - i_{dc}) \\ \Delta v_{d\_i}^* = \frac{K_{id2}}{s}(i_d^* - i_{dc}) \\ \Delta v_{q\_p}^* = K_{pq2}(i_q^* - i_{qc}) \\ \Delta v_{q\_i}^* = \frac{K_{iq2}}{s}(i_q^* - i_{qc}) \end{bmatrix} \tag{16}$$

[Number of 17]

$$\begin{bmatrix} v_{dc}^{****} = (\Delta v_{d\_p}^* + \Delta v_{d\_i}^*) - \omega_{dc} \frac{L_q^*}{R^*} \Delta v_{q\_i}^* \\ v_{qc}^{****} = (\Delta v_{q\_p}^* + \Delta v_{q\_i}^*) + \omega_{dc} \frac{L_q^*}{R^*} \Delta v_{d\_i}^* + \omega_{dc} Ke^* \end{bmatrix} \tag{17}$$

where, $K_{pd2}$ is the proportional gain of current control on the $d_c$-axis, $K_{id2}$ is the integral gain of current control on the $d_c$-axis, $K_{pq2}$ is the proportional gain of current control on the $q_c$-axis, and $K_{iq2}$ is the integral gain of current control on the $q_c$-axis.

The vector control operation shown in (Formula 18) may also be performed using the primary delay signal $i_{qctd}$ of the current reference value $i_d^*$ of the $d_c$-axis and the current detection value $i_{qc}$ of the $q_c$-axis, speed estimate $\omega_{dc}$ and the electrical circuit parameters of magnet motor 1.

[Number of 18]

$$\begin{bmatrix} v_{dc}^{****} = R^* i_d^* - \omega_{dc} L_q^* i_{qctd} \\ v_{qc}^{****} = R^* i_{qctd}^* + \omega_{dc} L_q^* i_d^* + \omega_{dc} Ke^* \end{bmatrix} \tag{18}$$

In Examples 1 to 5, the switching element that constitutes power converter 2 may be a Si(silicon) semiconductor element or a wide bandgap semiconductor element such as SiC (silicon carbide) or GaN (gallium nitride). IGBT (Insulated gate bipolar transistors) may also be used as switching elements.

In Examples 1 through 5, the motor is described using magnet motor as an example, but the same effect can be obtained by replacing it with an induction motor.

REFERENCE SIGNS LIST

1: magnet motor
2: power converter
3: DC power supply
4: current detector
5: coordinate conversion unit
6: speed control arithmetic unit
7: filter calculator
8: vector control unit
9: phase error estimation unit
10: frequency and phase estimation unit
11: coordinate conversion unit
20: power converter
20*a*: power converter software
20*b*: digital operator of power converters
21: voltage detector
22: current detector
23: encoder
24: calculation part of vector current components
25: observation of each part of waveform
26: switching speed between low-speed and medium-high-speed ranges
27: damping ratio parameters to be set in the low-speed/medium-high-speed range
28: personal computers
29: tablet
30: smartphone
$i_d$*: d-axis current reference value
$i_q$*: q-axis current reference value
$\omega_{dc}$: speed estimate
$\omega_n$: mechanical angular velocity
ωr: magnet motor speed
$v_{dc}$*, $v_{dc}$, $v_{dc}$, $v_{dc}$*, $v_{dc}$, $v_{dc}$***: d-axis voltage reference value
$v_{qc}$*, $v_{qc}$, $v_{qc}$*, $v_{qc}$**, $v_{qc}$***: q-axis voltage reference value
P: power value
Pa: active power value
$\Delta\theta_c$: estimated phase error
$\zeta_a$, $\zeta_b$: damping ratio parameter

The invention claimed is:

1. A power converter with a control unit that controls output frequency, output voltage and output current of a motor, the control unit calculates a first torque current command from a deviation between a speed reference point and a speed estimate of the motor, switches a control mode to either a control mode that suppresses pulsation of a speed of the motor or a control mode that suppresses pulsation of a torque of the motor, and calculates a second torque current command from the first torque current command and a switched control mode, the control unit equips a first secondary transfer function filter corresponding to a control mode that suppresses the pulsation of the speed of the motor and a second secondary transfer function filter corresponding to a control mode that suppresses the pulsation of the torque of the motor, and selects either the first secondary transfer function filter or the second secondary transfer function filter from the speed reference point of the motor.

2. The power converter according to claim 1, the control unit change parameters set in a secondary transfer function filter from the speed reference point of the motor, and switches the control mode.

3. The power converter according to claim 1, the control unit calculates a power value of the motor, changes the parameters to be set in the secondary transfer function filter from the power value of the motor, and switches the control mode.

4. The power converter according to claim 1, the control unit selects the control mode to suppress the pulsation of the speed of the motor when the speed of the motor is in a low speed range below a predetermined magnitude, the control unit selects the control mode that suppresses the pulsation of the torque of the motor when the speed of the motor is in a medium to high speed range above the predetermined magnitude.

5. The power converter according to claim 1, the control unit calculates the power value of the motor, when the power value is in a low power range below a predetermined magnitude, select the control mode to suppress the pulsation of the speed of the motor, when the power value is in a medium to high power range above the predetermined magnitude, select a control mode that suppresses the pulsation of the torque of the motor.

6. The power converter according to claim 1, the control unit switches between the control modes by changing the damping ratio parameters set for the secondary transfer function filter.

7. The power converter according to claim 6, the damping ratio parameter comprises a first damping ratio parameter and a second damping ratio parameter power converter.

8. The power converter according to claim 1, the power converter is used to set a value to switch the control mode from external equipment.

9. The power converter according to claim 1, the control unit sets a value to switch the control mode of the power converter by learning a voltage reference value and estimated values of current detection, phase error and speed.

10. A power converter with a control unit that controls output frequency, output voltage and output current of a motor, the control unit calculates a first torque current command from a deviation between a speed reference point and a speed estimate of the motor, switches a control mode to either a control mode that suppresses pulsation of a speed of the motor or a control mode that suppresses pulsation of a torque of the motor, and calculates a second torque current command from the first torque current command and a switched control mode, the control unit equips a first secondary transfer function filter corresponding to a control mode that suppresses the pulsation of the speed of the motor and a second secondary transfer function filter corresponding to a control mode that suppresses the pulsation of the torque of the motor, calculates the power value of the motor, and selects either the first or second secondary transfer function filter from the power value of the motor.

11. A power converter with a control unit that controls output frequency, output voltage and output current of a motor, the control unit calculates a first torque current command from a deviation between a speed reference point and a speed estimate of the motor, switches a control mode to either a control mode that suppresses pulsation of a speed of the motor or a control mode that suppresses pulsation of a torque of the motor, and calculates a second torque current command from the first torque current command and a switched control mode, the control unit switches between the control modes by changing the damping ratio parameters set for the secondary transfer function filter, the damping ratio parameter comprises a first damping ratio parameter and a second damping ratio parameter power converter, the first damping ratio parameter is a coefficient of a linear component of a Laplace operator of a numerator term of the secondary transfer function filter, the second damping ratio parameter is a coefficient of a linear component of a Laplace operator of a denominator term of the secondary transfer function filter, the control unit change the first and second damping ratio parameters to the damping ratio parameters that suppress the pulsation of the speed of the motor when the control mode that suppresses the pulsation of the speed of the motor is selected, change the first and second damping ratio parameters that suppress the pulsation of the torque of the motor when the control mode that suppresses the pulsation of the torque of the motor is selected.

* * * * *